United States Patent [19]
Keenan

[11] Patent Number: 5,095,648
[45] Date of Patent: * Mar. 17, 1992

[54] FLEA COLLECTOR

[76] Inventor: F. Edward Keenan, 2185 Tierra Verde Rd., Vista, Calif. 92084

[*] Notice: The portion of the term of this patent subsequent to Jul. 9, 2008 has been disclaimed.

[21] Appl. No.: 677,071

[22] Filed: Mar. 29, 1991

Related U.S. Application Data

[63] Continuation-in-part of Ser. No. 516,091, Apr. 27, 1990, Pat. No. 5,029,411.

[51] Int. Cl.$^5$ .............................. A01M 5/02
[52] U.S. Cl. .................................. 43/136; 43/133
[58] Field of Search ............... 43/136, 133, 114, 115, 43/116, 122

[56] References Cited

U.S. PATENT DOCUMENTS

| | | | |
|---|---|---|---|
| 787,037 | 4/1905 | Hackett | 119/87 |
| 1,005,443 | 10/1911 | Luckett | 43/136 |
| 3,708,908 | 1/1973 | Levey | 43/122 |
| 4,052,811 | 10/1977 | Shuster | 43/116 |
| 4,279,095 | 7/1981 | Aasen | 43/139 |
| 4,425,733 | 1/1984 | Ammon | 43/115 |
| 4,551,941 | 11/1985 | Schneidmiller | 43/122 |
| 4,599,823 | 7/1986 | Lee | 119/91 |
| 4,815,232 | 3/1989 | Rawski | 43/136 |
| 4,907,366 | 3/1990 | Balfour | 43/114 |

FOREIGN PATENT DOCUMENTS 2835737  3/1980  Fed. Rep. of Germany ........ 43/136

OTHER PUBLICATIONS

Brody Enterprises—Jun. 1990, catalog p. 3.

Primary Examiner—Richard K. Seidel
Assistant Examiner—Chuck Y. Mah
Attorney, Agent, or Firm—Henri J. A. Charmasson

[57] ABSTRACT

A yellow-colored plate coated with a tacky substance is combined with an animal odor-emanating component and passed over an area infested by fleas or other insect pests. The emanations excite and attract the insects which jump toward the brightly colored plate where they become entrapped into the tacky substance. The apparatus may be used to either determine the nature and extent of the infestation prior to treatment, or to actually clear areas of infestation.

15 Claims, 1 Drawing Sheet

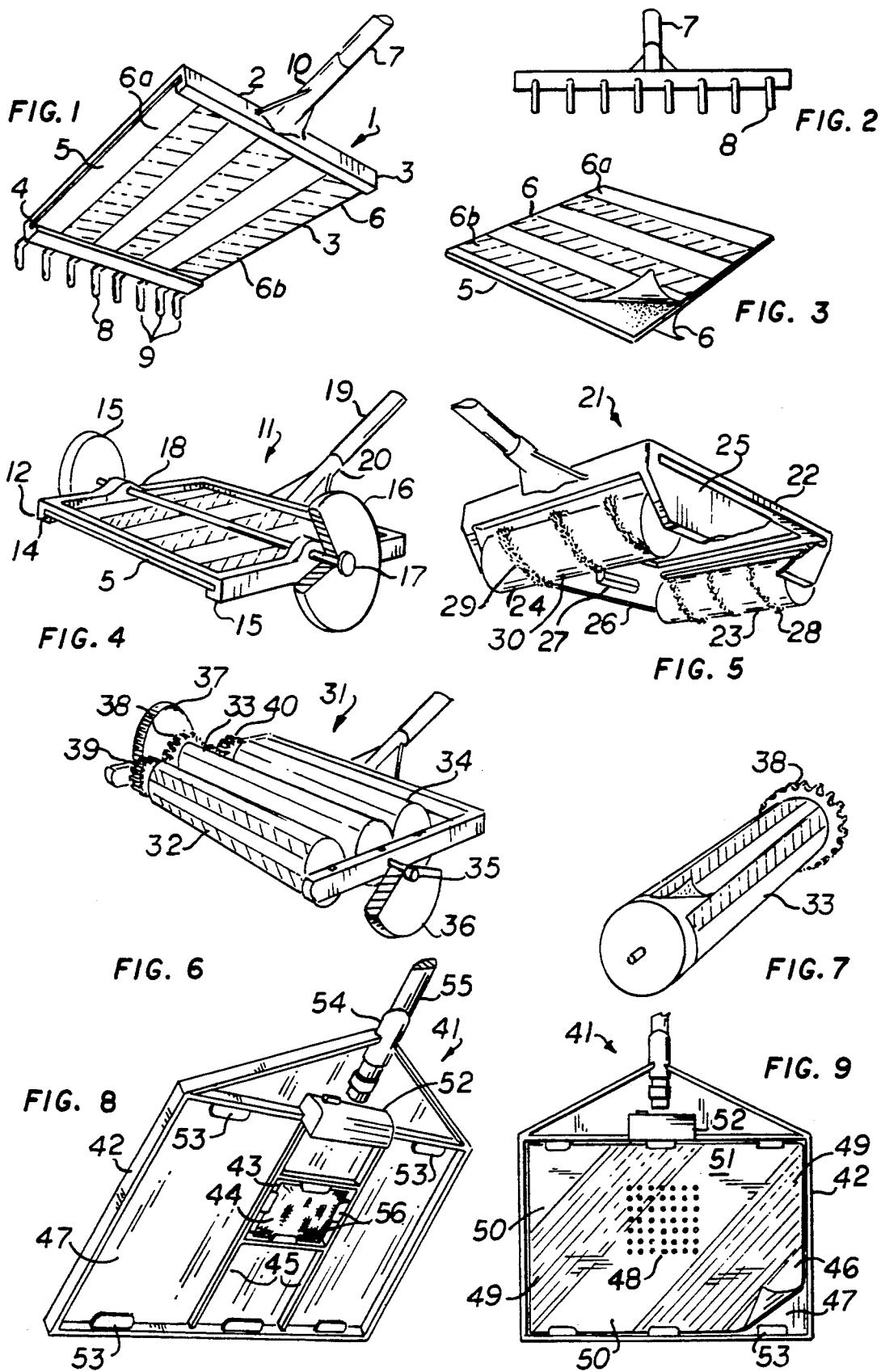

FLEA COLLECTOR

PRIOR APPLICATION

This is a continuation-in-part of application Ser. No. 07/516,091 filed Apr. 27, 1990, now U.S. Pat. No. 5,029,411.

BACKGROUND OF THE INVENTION

This invention relates to the prevention, identification and control of insect pests and parasites, and more specifically to the non-toxic extermination of fleas and similar jumping or biting insects.

The cat flea, the dog flea, and the rat flea have been a scourge since the dawn of humanity. Not only can they cause unbearable discomfort to both humans and animals, they also carry diseases including bubonic plague still endemic in many parts of the United States. Flea control is commonly achieved by chemical products whose toxicity can have adverse consequences not only on individuals affected with allergies, but also on the entire environment. Man is beginning to learn some bitter lessons from excessive use of DDT, chlorodane and numerous other pesticides in the control of fleas and other insects in previous decades, and also from the high toxicity of sites where domestic and industrial wastes have been dumped. Yet there is no effective non-toxic means to control flea infestations. It is therefore imperative to avoid any abuse of pesticides and to use them only when, and to the extent necessary. Due to the ubiquitous character of fleas, people tend to impute to them any bite or other suspicious redness of the skin. Pesticides are often sprayed indiscriminately to vast areas, often far beyond what would be necessary to eliminate the culprit.

Pest control personnel called in to treat an allegedly infested area have no practical means to collect samples of the suspected pest in order to determine their proper identity and extent of infestation. They end up spraying often indiscriminately with highly toxic substances formulated to kill a broad spectrum of insects, when in fact a limited application of a more specific and/or benign chemical would have sufficed.

SUMMARY OF THE INVENTION

The instant invention addresses the problem presented by an indiscriminate and widespread use of highly toxic pesticides in our environment for the treatment of bug infested living areas by providing a means of prevention as well as for collecting and properly identifying specimens of the offending insect, and thus limiting treatment to specific pest and affected areas. It also provides a non-toxic means for mechanically removing fleas and other similar pests from floor coverings and other living areas in which they most often dwell.

This is accomplished by an apparatus for passing a surface covered with a tacky substance in close proximity to the infested area that relies on the sensitivity of fleas to vibration and heat and attraction to light and to light variations caused by the movement of passing host animals, and to odoriferous emanations indicative of a warm-blooded animal presence which cause them to jump and get entangled in the tacky substance.

BRIEF DESCRIPTION OF THE DRAWING

FIG. 1 is a perspective view of a first embodiment of the invention in the form of a collecting rake;

FIG. 2 is a front elevational view thereof;

FIG. 3 is a perspective view of the flea collecting plate;

FIG. 4 is a perspective view of a second embodiment of the invention;

FIG. 5 is a perspective view of a third embodiment of the invention in the form of an illuminated carriage;

FIG. 6 is a perspective view of a fourth embodiment of the invention in the form of a rolling carriage with three collecting rollers;

FIG. 7 is a bottom perspective view of a collecting roller;

FIG. 8 is a bottom perspective view of a fifth embodiment of the invention; and

FIG. 9 is a bottom plan view thereof equipped with the insert collecting sheet.

DESCRIPTION OF THE PREFERRED EMBODIMENT OF THE INVENTION

Referring now to the drawing, there is shown in FIGS. 1 and 2 a hand-tool 1 particularly adapted for collecting specimens of fleas and other similar pests dislodged or lured from a carpet or other similar type of floor covering including hard floors. The tool comprises a main body 2 forming a tray supported on two opposite sides by a flange 3 which forms parallel slots 4 shaped and sized to receive the collecting plate 5 illustrated in FIG. 3. The plate is formed by a planar, quadrangular section of rigid material such as cardboard, plastic or the like on the top and bottom surfaces of which has been attached a preferably multi-colored sheet 6 of fabric or paper which has been coated with a tacky substance of the type used on so-called flypapers and glue-board trays. Each sheet 6 comprises alternating strips of bright yellow 6a and darker blue 6b colors. When the section, or plate 5 is inserted through the slot 4, the tool can be manipulated by its long handle 7 which extends obliquely from one side of the tray. The row of teeth 8 which extends downwardly from the side of the tray opposite the handle 7 are intended to contact the floor covering in a back and forth raking movement. Tips 9 of the teeth 8 are purposely rounded to avoid damaging the floor covering, and to facilitate the raking movement. When a flea, or other attracted insect pests present in the carpet is excited by the vibrating movement of the teeth 8 against the carpet, and attracted by the colored sheet 6 it will jump and become embedded in the tacky substance covering the sheet 6. Certain insects such as fleas are known to be attracted by a bright yellow color; other insects respond to the color blue. The attraction of the plate 6 may be greatly enhanced by the addition to the tacky substance of a pheromonal composition derived from the glands of the same species of animal or a kairomonal composition derived from the glands of a potential host animal. The gusseted socket 10 which mounts the handle 7 is designed to accept the distal tip of common broomstick. It should be noted that the teeth 8 could be replaced by clumps of bristles which could sweep and throw toward the plate 5, not only insects, but also their larvae and eggs.

The second embodiment of the invention 11 illustrated in FIG. 4 comprises a similar tray 12 with flange 13 and slot 14 which mounts the same collecting plate 5. The tray is supported by a pair of wheels 15, 17 mounted on opposite ends of an axle 17 passing through a bearing 18 in the middle of the back area of the tray 12. The handle 19 and mounting bracket 20 are similar to those of the first embodiment. The motion and vibrations necessary to excite and attract the fleas are imparted by the movement of the wheels.

In the third embodiment of the invention 21 illustrated in FIG. 5, the slotted tray 22 is supported by a pair of front and back rollers 23, 24. The rollers are mounted between sides 25, 26 extending downwardly from the lateral edges of the tray. A small light 27 mounted against the inside of one of the lateral walls 25, 26 provides additional illumination to the colored sides of the collecting plates not shown in this figure. The peripheral surfaces 28, 29 of the rollers may be covered with bristles 30 to better agitate the treads of carpeting. In order to better illuminate both sides of the plates 5, it is preferably made of a transparent or translucent material.

The fourth embodiment of the invention 31 illustrated in FIG. 6 follows the same basic design as the second embodiment illustrated in FIG. 4, but provides an expanded collecting surface. Instead of using the plate 5, the collecting element is constituted by three parallel cylinders 32, 33, and 34 on the peripheral surfaces of which have been bonded colored sheets of paper or fabric coated with the tacky surface as better illustrated in FIG. 7. The central cylinder 33 is coaxial with the axle 35 of the supporting wheels 36 and 37, and thus driven by the movement of the wheels. The spur-gear 38 at the end of the central cylinder 33 is coupled to spur-gears 39 and 40 respectively associated with the front and back cylinders 32 and 34. As the device is rolled over a carpet, the three cylinders rotate slowly exposing a much larger collecting surface to the carpet or floor than would be exposed by the previous embodiments.

Thus when the presence of fleas or other insect pests is suspected on the premises, either one of the four embodiments of the invention just described can be passed over the suspected infested area in order to verify the presence and nature of the pests. As the floor is vibrated by the raking or rolling motion of the device fleas, if any are present, will be excited by the vibrations and attracted by the colored sheet of the collecting plate. They will jump and become entrapped in the tacky material. Once the presence, identification and extent of the infestation has been determined, proper treatment can be applied, limited to the infested area. The dark strips 6b on the collecting plate offer a contrasting background for the detection and identification of light-colored eggs, larvae and insects; while the light-colored strip 6a facilitates the detection and identification of darker-colored species. In many cases, repeated passage of the device over the infested area is all that will be necessary to rid the area of the infestation, thus preventing an outbreak.

In the fifth embodiment 41 illustrated in FIGS. 8 and 9, the bottom face of the tray or plate 42 has a centrally located compartment 43 which houses a pest-attracting component 44. The compartment 43 is a recess or cavity delineated by ribbings 45 spanning the width of the tray. As in the previously described embodiments, an insect collecting sheet 46 is applied over the bottom surface 47 of the tray. The sheet 46 has perforations 48 in the area over the compartment 43 in order to allow emanations from the pest-attracting component 44 to exude through them and toward the area suspected of infection. The collecting sheet 46 is colored in contrasting color zones 49, 50 in order to facilitate identification of various shades of critters collected by its tacky surface 51. One of the colors is preferably in the yellow-green wavelength to which fleas are believed to be most attracted.

The sheet 46 is illuminated by a light fixture 52 centrally mounted on the edge of the tray. The light bulb, which does not show on the drawing, provides both light and heat to attract the fleas and other insects. Tabs 53 extending from the inner rim surfaces of the tray hold the collecting sheet in place. A socket 54 on one side of the tray 42 receives the end of a broom handle 55 which is held substantially in the same plane as the tray.

The handle 55 allow the operator to sweep the device over any surface suspected of harboring fleas or other unwanted insects with the collecting sheet facing the scanned surface at a distance of ten to twenty centimeters thereto for maximum efficiency.

Besides the yellow-green color and the light and heat generated by the light fixture 52, the insects can be attracted by various types of emanations generated by the pest-attracting component 44. One of the most effective attractants for fleas may be the odor common to their preferred host. Cat and dog fleas will be attracted by a kairomonal component comprising a swab or sponge humected with a feline or canine scent exudate. Such an exudate can be collected from various scent glands such as the anal sac of a cat or dog. An animal-smelling composition can also be manufactured by macerating animal hair into acetone or other similar solvent. Synthetic pheromonal or kairomonal compositions are commercially available. An animal blood serum may also be used. The kairomonal component can also be mixed to the tacky compound on the surface of the sheet 46.

It is known that fleas may be attracted by carbon dioxide in the breath of animals. The pest-attracting component 44 could comprise a slow releasing cartridge of carbon dioxide, or a carbonated compound under seal from which carbon dioxide will emanate after the seal is broken.

In lieu of the light fixture 52 or in addition to it, the pest-attracting component 44 could include a chemical heat source. Various types of heat packs are readily available on the market of a size and shape that can be conveniently installed in the cavity 43 between the retaining tabs 56. Most of those heat packs contain components which when brought together or exposed to atmospheric oxygen trigger an exothermic reaction. The exothermic reaction which lasts for several minutes or even hours is initiated by either squeezing the pad and thus breaking internal barriers between the reacting components, wetting the pad, or removing a seal and thus exposing the reacting component to the air.

It can now be understood that the device can be effective against a variety of fleas and other insects which can be attracted by a variety of radiations and emanations, and prompted to jump toward the tacky surface of the collecting sheet 46 where they become entrapped. It is known that each added pest-attractant synergistically reinforces the others. The choice and combination of pest-attractant components can be appropriately selected to target a particular type of flea or other flying or jumping insect.

The tray 42 of this embodiment of the invention could also be integrated in the raking and rolling apparatuses shown in FIGS. 1-5, thus combining raking, vibrations, color, light and heat radiations, and chemical emanations as effective attractants.

The plates and rollers of the various embodiments may also be made hollow and from containers to be filled with hot water.

While the preferred embodiments of the invention have been described, modifications can be made and other embodiments may be devised without departing from the spirit of the invention and the scope of the appended claims.

What is claimed is:

1. A device for collecting fleas and other insect pests from floors, floor coverings, furs, upholstery, lawns and similar infested areas which comprises:
   a collecting plate having a surface coated with a tacky substance;
   means for passing said surface at a short distance over said areas; and
   means on said surface for generating emanations suggestive of the presence of a warm-blooded animal body.

2. The device of claim 1, wherein said means for generating comprises an odoriferous substance.

3. The device of claim 2, wherein said odoriferous substance is an animal tissue exudate.

4. The device of claim 3, wherein said odoriferous substance comprises animal hair extract.

5. The device of claim 3, wherein said odoriferous substance comprises blood serum.

6. The device of claim 2, wherein said means for generating comprises means for expelling carbon dioxide.

7. The device of claim 6, wherein said means for generating comprises a carbonated compound.

8. The device of claim 6, wherein said means for generating comprises a cartridge of pressurized carbon dioxide.

9. The device of claim 1, wherein said means for generating comprises a kairomonal compound mixed with said tacky substance.

10. The device of claim 1, wherein said means for generating comprises a heat source.

11. The device of claim 10, wherein said heat source is an electric bulb.

12. The device of claim 10 wherein said means for generating comprises means for creating an exothermic chemical reaction.

13. The device of claim 1, wherein said collecting plate comprises a colored zone in the green-yellow wavelength range.

14. A device for collecting fleas and other insect pests from floor, floor coverings, furs, upholstery, lawns and similar infested areas which comprises:
    a collecting plate having a surface with a tacky substance;
    means for passing said surface at a short distance over said area; and
    means on said surface for generating emanations suggestive of the presence of a warm-blooded animal body;
    said means for generating comprising:
    a compartment centrally located on said collecting plate; and
    a member in said compartment holding an odoriferous substance extracted from an animal tissue.

15. The device of claim 14, wherein said collecting plate comprises a sheet coated with a tacky substance, said sheet being applied over said plate and compartment and having perforations in an area covering said compartment.

* * * * *